United States Patent
Chen et al.

(10) Patent No.: US 6,741,934 B2
(45) Date of Patent: May 25, 2004

(54) GLOBAL POSITIONING SYSTEM ELECTRONIC CARD CAPABLE OF DYNAMICALLY PLUGGING NAVIGATION INFORMATION

(75) Inventors: Caph Chen, Kaohsiung (TW); Jui Chung Chen, Kaohsiung Hsien (TW); Sidney Young, Hsin-Chu (TW); Gordon Yu, Taipei (TW)

(73) Assignees: C-One Technology Corporation, Hsin-Chu (TW); Pretec Electronics Corporation, Fremont, CA (US)

( * ) Notice: Subject to any disclaimer, the term of this patent is extended or adjusted under 35 U.S.C. 154(b) by 0 days.

(21) Appl. No.: 10/357,373

(22) Filed: Feb. 4, 2003

(65) Prior Publication Data

US 2003/0163254 A1 Aug. 28, 2003

(30) Foreign Application Priority Data

Feb. 27, 2002 (TW) ...................................... 91202339 U

(51) Int. Cl.⁷ .............................................. G01C 21/26
(52) U.S. Cl. .................. 701/213; 701/36; 713/193; 455/456; 710/52; 342/357.13
(58) Field of Search ................................ 701/213, 208, 701/200, 207, 36, 52; 340/990, 995, 988, 997; 313/193; 455/456, 457; 342/357.13

(56) References Cited

U.S. PATENT DOCUMENTS 5,964,821 A * 10/1999 Brunts et al. ............... 701/201
6,266,612 B1 * 7/2001 Dussell et al. .............. 701/207
6,604,047 B1 * 8/2003 Harris ......................... 701/213
6,622,083 B1 * 9/2003 Knockeart et al. .......... 701/202
2001/0012980 A1 * 8/2001 Uchida et al. ............... 701/208
2002/0196181 A1 * 12/2002 Fall ......................... 342/357.06

FOREIGN PATENT DOCUMENTS

CA          WO96/14558      * 5/1996

* cited by examiner

*Primary Examiner*—Thomas G. Black
*Assistant Examiner*—Tuan C To
(74) *Attorney, Agent, or Firm*—Bacon & Thomas, PLLC

(57) ABSTRACT

There is disclosed a global positioning system electronic card capable of dynamically plugging navigation information, which includes a multi-interface controller, a dynamic insertion/removal card interface for being dynamically inserted with a memory card stored with map data, a GPS module, and a host interface. When the memory card is inserted into the dynamic insertion/removal card interface, the dynamic insertion/removal card interface notifies the multi-interface controller for further informing the host device through the host interface to read the map data in the memory card, thereby displaying a corresponding map. After determining the positioning coordinate, the GPS module notifies the multi-interface controller for further informing the host device through the host interface to read the positioning coordinate determined by the GPS module, which is compared with the map data read previously, thereby labeling a coordinate position on the map.

10 Claims, 4 Drawing Sheets

GLOBAL POSITIONING SYSTEM ELECTRONIC CARD CAPABLE OF DYNAMICALLY PLUGGING NAVIGATION INFORMATION

BACKGROUND OF THE INVENTION

1. Field of Invention

The present invention relates to a multi-interface electronic card, and more particularly to a global positioning system (GPS) electronic card capable of dynamically plugging navigation information for a portable device.

2. Description of Related Art

With the advance of satellite communication technology, the global positioning system is widely used. Since the electronic devices are made more and more compact, the terminal devices of the global positioning system can be made in a portable electronic device, such as a personal digital assistant (PDA). Thus, users are able to possess the global positioning capability by simply carrying the PDA.

To implement the GPS function in a PDA, a memory card with a map data of specific area is inserted into a PCMCIA/CF slot of a PDA. After the map data is loaded into the PDA. The memory card is removed and then a GPS module card is inserted into the PCMCIA/CF slot, so as to receive the signals from satellite forming being matched with the map data in the memory, thereby determining the position of the user.

However, when the user arrives at a new area and the map data must be updated, the GPS module card has to be removed and a memory card with the map of the new area is inserted into the PCMCIA/CF slot of the PDA. Thus, the new map data is loaded into the memory of the PDA. Then, the memory card is removed and the GPS module card is inserted into the PCMCIA/CF slot of the PDA again. Such a process is too tedious and inconvenient to be executed.

To avoid the aforementioned problem, a direct approach is to manufacture the memory module and the GPS module on one multi-functional electronic card, wherein the memory module is stored with the map data of a specific area. Therefore, by only inserting this multi-functional electronic card into the PCMCIA/CF slot of a PDA, it is able to load map data into the memory of the PDA and receive the signals form the GPS to position the user's coordinate. However, when the user arrives at a new area and the map data must be updated, this electronic card still has to be removed, and another multi-functional electronic card with GPS module and memory module stored with the map data of the new area is inserted into the PCMCIA/CF slot. Again, the new map data is loaded into the memory of the PDA. This will cause an interrupt in executing the GPS and thus the efficiency is low. Therefore, the aforementioned electronic card for implementing the function of GPS is required to be improved.

SUMMARY OF THE INVENTION

Accordingly, the primary object of the present invention is to provide a GPS electronic card capable of dynamically plugging navigation information, wherein the map data can be updated conveniently.

Another object of the present invention is to provide a GPS electronic card capable of dynamically plugging navigation information, wherein in updating the map data, the operation of GPS module is not interrupted.

To achieve above object, a dynamic plug-in navigation information of an electronic peripheral card of a global positioning system comprising a mainframe interface, a dynamic plug-in card interface, a global positioning system module, and a mainframe interface. The dynamic plug-in card interface can store a memory card with map data. The dynamic plug-in card interface is connected to the multiple interface controller. The dynamic plug-in card interface can be dynamically inserted into a memory card with map data. The global positioning system module serves for calculating and receiving positioning coordinate of a global positioning system. The mainframe interface is connected to said multiple interface controller for being inserted to a mainframe. When the memory card is dynamically inserted into the dynamic plug-in card interface, the dynamic plug-in card interface inform the multiple interface controller for informing the mainframe through the mainframe interface so as to read the map data in the memory card, thereby, the corresponding map being displayed. Then global positioning system module calculates positioning coordinates and then informs the multiple interface controller. Then it inform the mainframe through the mainframe interface for reading the positioning coordinates calculated from the global positioning system module which is used to contrast the map data loading to the memory card in advance; then the coordinates are indicated on a map.

The memory card with map data can be a Smart Media (SM) card, a Compact Flash (CF) card, a Memory Stick (MS) card, a Secure Digital (SD) card, or a MMC (Multi-Media Card).

DESCRIPTION OF PREFERRED EMBODIMENTS

Figure 1:
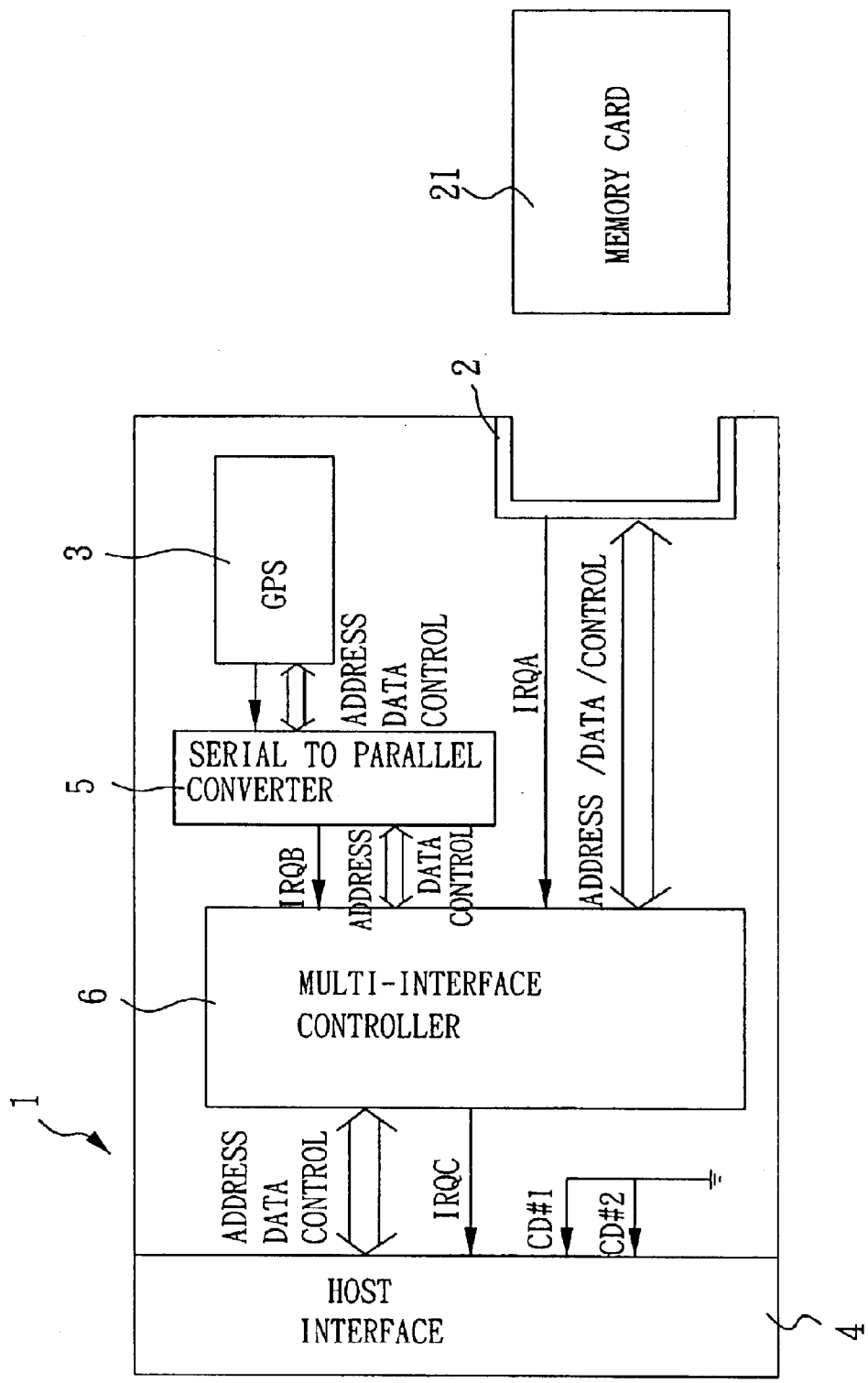
FIG. 1 is a functional block diagram of the GPS electronic card capable of dynamically plugging navigation information according to a preferred embodiment of the present invention.

FIG. 1 shows a preferred embodiment of the GPS electronic card capable of dynamically plugging navigation information in accordance with the present invention, which includes a dynamic insertion/removal card interface 2, a GPS module 3, a host interface 4, a serial to parallel converter 5, and a multi-interface controller 6. The dynamic insertion/removal card interface 2 can be inserted with a memory card 21. The memory card 21 is stored with map or other related information, or provided with a storage memory for use as an external extension memory by a host device (not shown) inserted with this GPS electronic card 1. This memory card 21 can be a Smart Media (SM) card, a Compact Flash (CF) card, a Memory Stick (MS) card, a Secure Digital (SD) card, a MMC (Multi-Media Card), or the like.

The GPS module 3 is provided for receiving the positioning signals from the GPS system to calculate the positioning coordinates. Then, the coordinates determined by the GPS module 3 is converted from serial signal into parallel signal by the serial to parallel converter 5 for being sent to the multi-interface controller 6.

Preferably, the host interface 4 is a PCMCIA/CF interface for being connected to a host, such as a PDA. The card detecting pins CD#1 and CD#2 of the PCMCIA/CF interface are fixed to a level representing that a card is inserted; that is, the CD#1 and CD#2 pins are fixed to ground. The dynamic insertion/removal card interface 2 detects whether a memory card 21 is inserted therein by an interrupt mechanism. When the memory card 21 has not been inserted into the dynamic insertion/removal card interface 2, the interrupt signal IRQA of the dynamic insertion/removal card interface 2 is inactive. When the memory card 21 is inserted into the dynamic insertion/removal card interface 2, the interrupt signal IRQA becomes active, so that the multi-interface controller 6 can detect such an insertion/removal status. Therefore, the GPS module 3 can operate normally without being affected by the insertion/removal operation of the memory card 21.

Figure 2A:
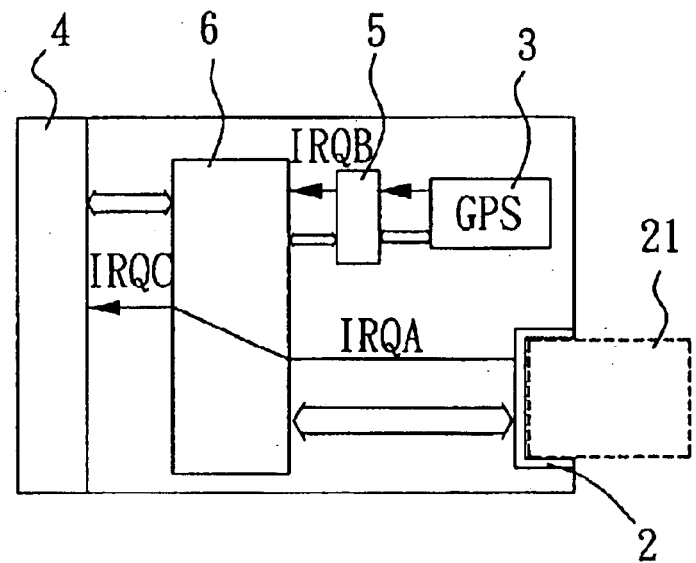
FIG. 2 is a schematic view showing that the GPS module and dynamic insertion/removal card interface issues interrupts to the multi-interface controller.

Also referring to FIG. 2, there is illustrated a schematic view, in which the GPS module 3 and the dynamic insertion/removal card interface 2 issue interrupt signals to the multi-interface controller 6. As described hereinabove, when the memory card 21 is inserted into the dynamic insertion/removal card interface 2, the dynamic insertion/removal card interface 2 will notify the multi-interface controller 6 of such by the interrupt signal IRQA, thereby making the multi-interface controller 6 issue an interrupt signal IRQC via the host interface 4 to inform a host device to read the map data in the memory card 21, so as to display the map on the display panel of the host. Namely, when a memory card 21 is inserted for downloading the map data, the interrupt signal IRQC is originated from the interrupt signal IRQA, as illustrated in FIG. 2A.

Figure 2B:
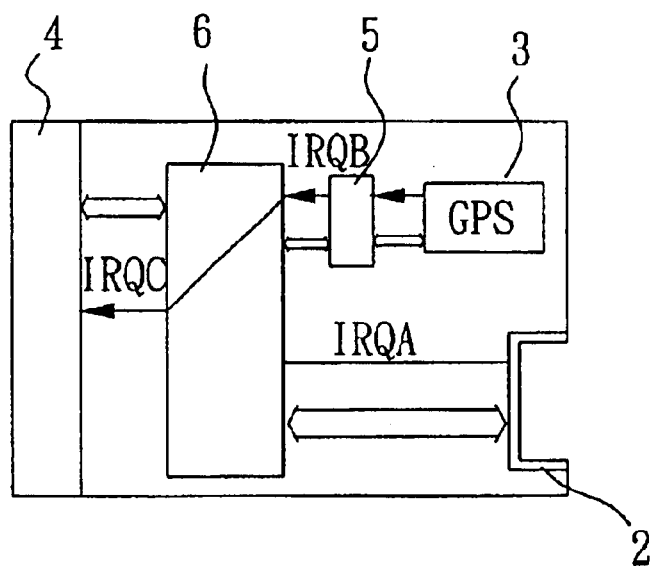

After the GPS module 3 receives the positioning signals from the GPS system and determines the positioning coordinates, the coordinate data is converted from serial signal to parallel signal by the serial to parallel converter 5, and an interrupt signal IRQB is issued to inform the multi-interface controller 6 to generate an interrupt signal IRQC, so as to notify the host device via the host interface 4 to read the positioning coordinate received and determined by the GPS module 3. Therefore, the host device can compare the positioning coordinate with the map data read in advance through a navigation software for labeling the coordinate position on the map. Namely, when the GPS module 3 receives the positioning signals from the GPS system, the interrupt signal IRQC is originated fron the interrupt signal IRQB, as illustrated in FIG. 2B.

Figure 3:
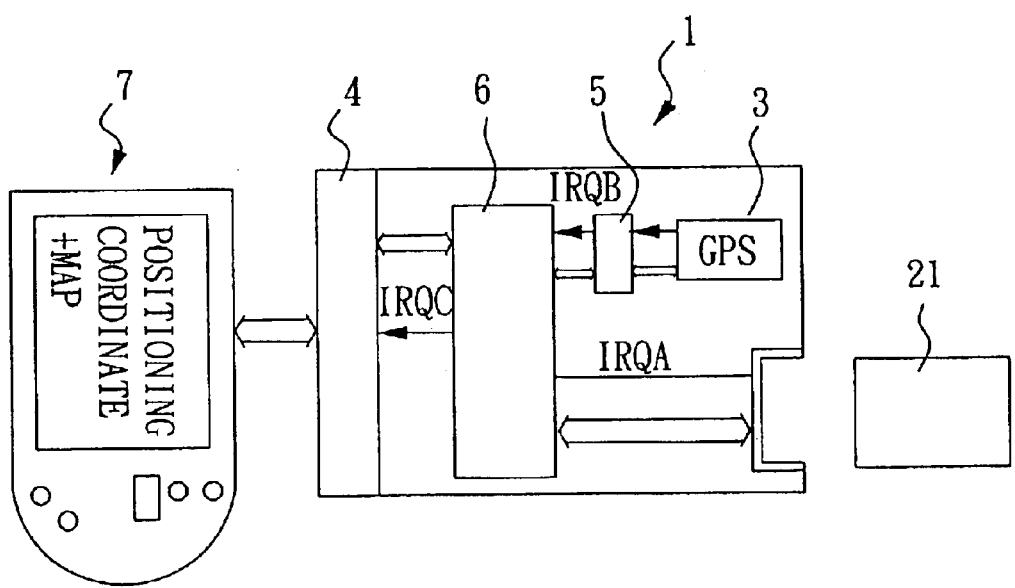
FIG. 3 schematically illustrates that the GPS electronic card capable of dynamically plugging navigation information of the present invention is inserted into a PDA.

FIG. 3 schematically illustrates that the GPS electronic card capable of dynamically plugging navigation information of the present invention is inserted into a PDA 7. When entering a new area, the user is only required to replace the memory card 21 without removing the whole electronic card 1. Furthermore, the insertion and removal of the memory card will not interrupt the GPS module 3. Therefore, the PDA 7 can quickly display the navigation positioning coordinate data on the map after the new memory card 21 is inserted therein. In addition, if the memory card 21 is stored with navigation application programs or provided with storage memory, the PDA can update its navigation program by the program of the memory card, and use the storage memory of the memory card 21 as an external extension memory.

Figure 4:
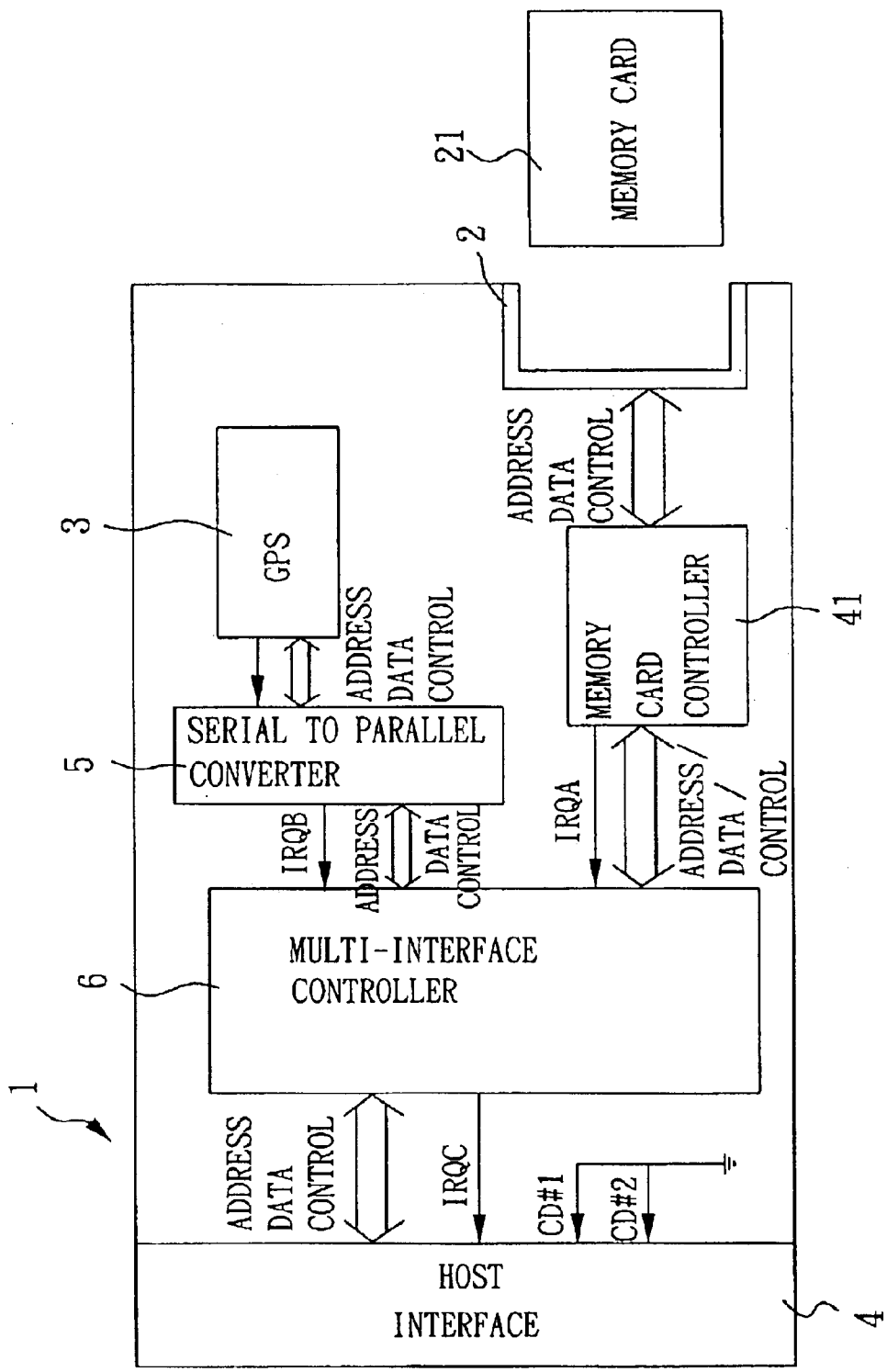
FIG. 4 is a functional block diagram of the GPS electronic card capable of dynamically plugging navigation information according to another preferred embodiment of the present invention.

FIG. 4 shows another preferred embodiment of the GPS electronic card capable of dynamically plugging navigation information in accordance with the present invention, which differs from the previous embodiment only in having an additional memory card controller 41. This memory card controller 41 is provided for controlling the read/write operation with a memory card without having a controller. As such, the GPS electronic card can be inserted with various types of memory cards.

Although the present invention has been explained in relation to its preferred embodiment, it is to be understood that many other possible modifications and variations can be made without departing from the spirit and scope of the invention as hereinafter claimed.

What is claimed is:

1. A global positioning system electronic card capable of dynamically plugging navigation information, comprising:
   a multi-interface controller;
   a dynamic insertion/removal card interface connected to the multi-interface controller for being dynamically inserted with a memory card stored with map data; and
   a global positioning system module for receiving and determining positioning coordinate from a global positioning system; and
   a host interface connected to the multi-interface controller for connecting to a host device,
   wherein when the memory card is inserted into the dynamic insertion/removal card interface, the dynamic insertion/removal card interface notifies the multi-interface controller for further informing the host device through the host interface to read the map data in the memory card, thereby displaying a corresponding map; and after determining the positioning coordinate, the global positioning system module notifies the multi-interface controller for further informing the host device through the host interface to read the positioning coordinate determined by the global positioning system module, which is compared with the map data read previously, thereby labeling a coordinate position on the map.

2. The global positioning system electronic card capable of dynamically plugging navigation information as claimed in claim 1, further comprising a serial to parallel converter connected to the multi-interface controller and the global positioning system module for converting the positioning coordinate determined by the global positioning system module from serial signals into parallel signals for being sent to the multi-interface controller.

3. The global positioning system electronic card capable of dynamically plugging navigation information as claimed in claim 2, wherein the dynamic insertion/removal card interface notifies the multi-interface controller by a first interrupt signal, and the global positioning system module notifies the multi-interface controller by a second interrupt signal through the serial to parallel converter.

4. The global positioning system electronic card capable of dynamically plugging navigation information as claimed in claim 3, wherein when receiving the first or second interrupt signal, the multi-interface controller informs the host device to read the map data or positioning coordinate by a third interrupt signal.

5. The global positioning system electronic card capable of dynamically plugging navigation information as claimed in claim 2, wherein the host interface has at least one card detecting pin fixed at a level representing that a card is inserted.

6. The global positioning system electronic card capable of dynamically plugging navigation information as claimed in claim 5, wherein the host interface is a PCMCIA/CF interface and the at least one card detecting pin includes a CD#1 pin and a CD#2 pin connected to ground.

7. The global positioning system electronic card capable of dynamically plugging navigation information as claimed in claim 1, wherein the memory card further comprises a navigation application program for updating a navigation operation program in the host device.

8. The global positioning system electronic card capable of dynamically plugging navigation information as claimed in claim 1, wherein the memory card has a storage memory for use as an extension memory by the host device.

9. The global positioning system electronic card capable of dynamically plugging navigation information as claimed in claim 1, wherein the memory card is a Smart Media card, a Compact Flash card, a Memory Stick card, a Secure Digital card, or a Multi-Media card.

10. The global positioning system electronic card capable of dynamically plugging navigation information as claimed in claim 1, further comprising a memory card controller for controlling read/write operation with a memory card which does not have a controller.

* * * * *